(12) United States Patent
Kitamoto

(10) Patent No.: US 8,957,671 B2
(45) Date of Patent: Feb. 17, 2015

(54) DISPLACEMENT DETECTION DEVICE, VEHICLE STEERING SYSTEM, AND MOTOR

(75) Inventor: Hiroshi Kitamoto, Toyota (JP)

(73) Assignee: JTEKT Corporation, Osaka (JP)

( * ) Notice: Subject to any disclaimer, the term of this patent is extended or adjusted under 35 U.S.C. 154(b) by 133 days.

(21) Appl. No.: 13/606,605

(22) Filed: Sep. 7, 2012

(65) Prior Publication Data

US 2013/0069635 A1 Mar. 21, 2013

(30) Foreign Application Priority Data

Sep. 20, 2011 (JP) ................. 2011-204384

(51) Int. Cl.
*G01R 33/07* (2006.01)
*G01D 5/14* (2006.01)
*G01D 5/251* (2006.01)

(52) U.S. Cl.
CPC ............. *G01D 5/145* (2013.01); *G01D 5/2515* (2013.01)
USPC ....................... 324/207.2; 324/251

(58) Field of Classification Search
USPC ..................................... 324/207.2
See application file for complete search history.

(56) References Cited

U.S. PATENT DOCUMENTS

| | | | |
|---|---|---|---|
| 5,422,568 A | 6/1995 | Hashizume et al. | |
| 2007/0046102 A1 | 3/2007 | Reithofer | |
| 2007/0046287 A1* | 3/2007 | Vervaeke et al. | 324/251 |
| 2007/0233423 A1 | 10/2007 | Uno | |
| 2008/0012557 A1 | 1/2008 | Hammerschmidt | |
| 2008/0030191 A1* | 2/2008 | Nishikawa | 324/252 |
| 2010/0109655 A1* | 5/2010 | Tanaka et al. | 324/207.25 |
| 2011/0018532 A1* | 1/2011 | Florescu et al. | 324/251 |

FOREIGN PATENT DOCUMENTS

| | | |
|---|---|---|
| EP | 2 309 230 A1 | 4/2011 |
| JP | A-9-318305 | 12/1997 |

OTHER PUBLICATIONS

Extended European Search Report dated Dec. 3, 2014 from European Patent Application No. 12183642.3.

* cited by examiner

*Primary Examiner* — Bot Ledynh
(74) *Attorney, Agent, or Firm* — Oliff PLC

(57) ABSTRACT

A motor rotation angle sensor includes a plurality of Hall elements and a plurality of switches, each a which is able to interrupt supply of power for operating a corresponding one of these Hall elements.

11 Claims, 3 Drawing Sheets

DISPLACEMENT DETECTION DEVICE, VEHICLE STEERING SYSTEM, AND MOTOR

INCORPORATION BY REFERENCE/RELATED APPLICATION

This application claims priority to Japanese Patent Application No. 2011-204384 filed on Sep. 20, 2011 the disclosure of which, including the specification, drawings and abstract, is incorporated herein by reference in its entirety

BACKGROUND OF THE INVENTION

1. Field of the Invention

The invention relates to a displacement detection device, a vehicle steering system, and a motor.

2. Discussion of Background

Conventionally, various displacement detection devices that include a displacement detection sensor have been proposed. U.S. Pat. No. 5,422,568 A1 describes that a Hall element is provided as a displacement detection sensor and a change in magnetic flux density, which occurs as a detection target (wheel) rotates, is detected as a displacement by the Hall element.

The Hall element is electrically connected to a power supply that supplies electric power to the Hall element for its operation in a displacement detection device that includes a plurality of Hall elements in order to, for example, improve redundancy, the following measures against a short-circuit fault, of one of the Hall elements are taken.

According to a first measure, the Hall elements are provided with individual power supplies. With this configuration, even if one of the. Hall elements is short-circuited, the remaining Hall elements are still operable. That is, as shown in FIG. 5, power circuits PA to PC are connected to a plurality of Hall elements HA to HC, respectively. In this case, for example, even if the Hall element HA is short-circuited, it is still possible to supply electric power from the power circuits PB, PC to the remaining Hall elements HB, HC. Therefore, it is possible to continue displacement detection with the use of the Hall elements HB, HC.

According to a second measure, there is employed a single power supply that has a current supplying capability which is high enough not to cause a voltage drop even if one of the Hall elements is short-circuited. That is, as shown in FIG. 6, a plurality of parallel-connected Hall elements HA to HC are connected to a single power circuit P, and limiting resistors RA to RC are connected in series with the Hall elements HA to HC, respectively. In this case, for example, even if the Hall element HA is short-circuited, when the power circuit P has a current supplying capability that is high enough to supply a current that is higher than or equal to a value of current flowing through the Hall element HA, it is possible to continue displacement detection with the use of the remaining Hall elements HB, HC.

However, according to the first measure shown in FIG. 5, multiple power circuits (PA to PC) are required, which increases the circuit size as a whole device. In addition, the power circuits are individually connected to the Hall elements (HA to HC). Therefore, there occur variations in voltages applied to the Hall elements, which may cause a detection error.

According to the second measure shown in FIG. 6, in order to increase the current supplying capability of the power circuit (P), the size of the power circuit is set large. In addition, if the resistance values of the limiting resistors (RA to RC) are increased in order to reduce a value (current limiting value) of current flowing through a short-circuited Hall element, voltages applied to the Hall elements decrease by an amount, of an increase in the amount of voltage drop in the limiting resistors. This reduces a dynamic range of displacement detection.

In addition, Japanese Patent Application Publication No. 9-318305 (JP 9-318305 A) describes a position detection device in which two Hall elements, which serve as displacement detection sensors, and a photo-interrupter are electrically connected to a single power supply. However, the photo-interrupter is used to correct, as an additional measure, a detection result obtained by the Hall element, having a large detection error. Therefore, the photo-interrupter is not used to interrupt supply of power.

SUMMARY OF THE INVENTION

The invention provides a displacement detection device with which the circuit size is further reduced as a whole device without reduction in detection accuracy, a vehicle steering system and a motor that are provided with the displacement detection device.

According to a feature of an example of the invention, a displacement detection device includes a plurality of displacement detection sensors and a plurality of interrupting means, each of which is able to interrupt supply of power for operating a corresponding one of the displacement detection sensors.

BRIEF DESCRIPTION OF THE DRAWINGS

The foregoing and further objects, features and advantages of the invention will become apparent from the following description of example embodiment with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
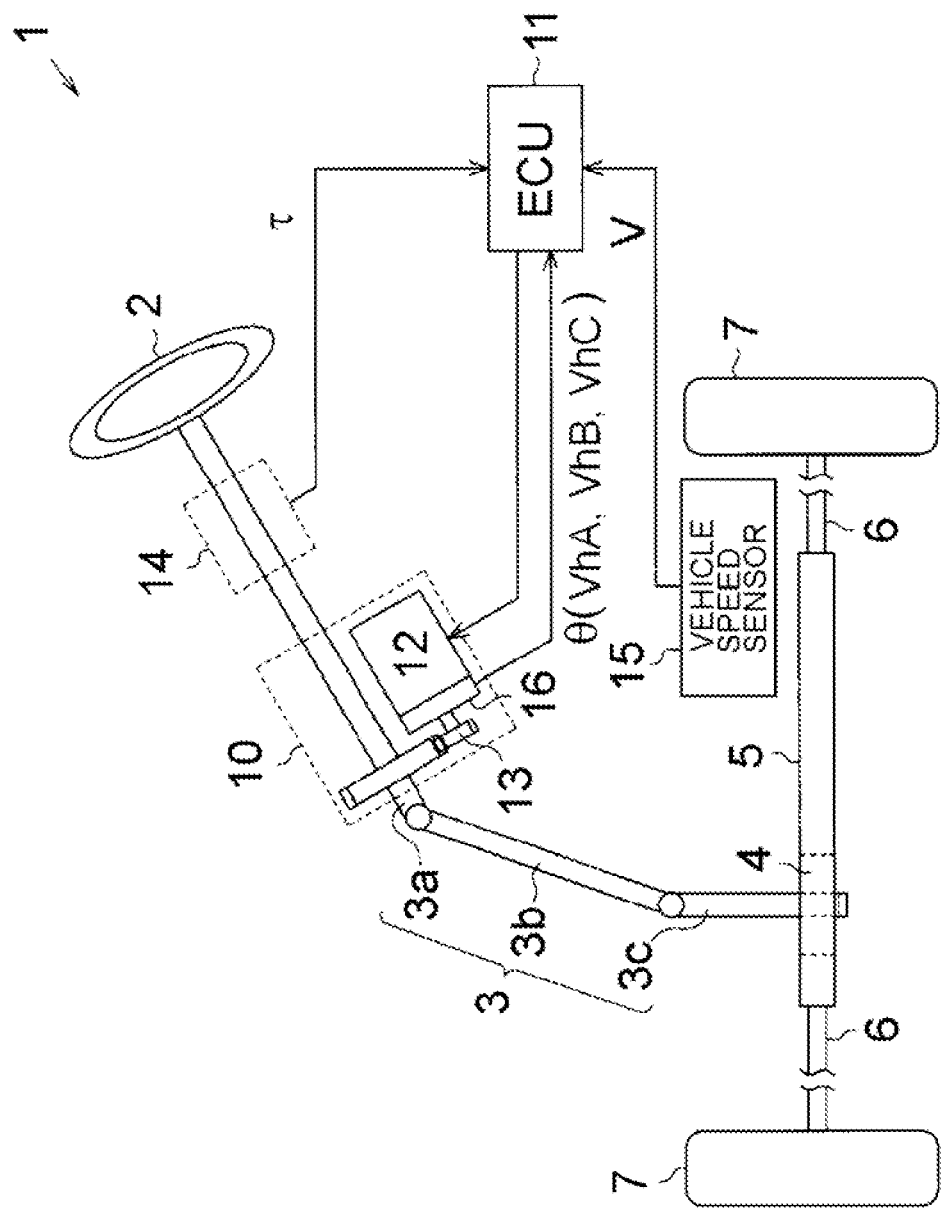
FIG. 1 is a schematic configuration view of an electric power steering system (EPS)

As shown in FIG. 1, in an electric power steering system (EPS) 1 according to an embodiment of the invention, a steering shaft 3 to which a steering wheel 2 is fixed is coupled to a rack shaft 5 via a rack-and-pinion mechanism 4, and the rotation of the steering shaft 3 resulting from a steering operation is converted into a linear reciprocal motion of the rack shaft 5 by the rack-and-pinion mechanism 4. The steering shaft 3 in the present embodiment is formed by coupling a column shaft 3a, an intermediate shaft 3b and a pinion shaft 3c to each other. The reciprocal linear motion of the rack shaft 5 resulting from the rotation of the steering shaft 3 is transmitted to knuckles (not shown) via tie rods 6 coupled to respective ends of the rack shaft 5. In this way, the steered angle of steered wheels 7, that is, the travelling direction of a vehicle, is changed.

The EPS 1 includes an EPS actuator 10 and an ECU 11. The EPS actuator 10 provides a steering system with assist force for assisting a driver in performing a steering operation. The ECU 11 controls an operation of the EPS actuator 10.

The EPS actuator 10 in the present embodiment is a so-called column-type EPS actuator in which a motor 12 that serves as a drive source is drivably coupled to the column shaft 3a via, a speed reduction mechanism 13. A brushless motor that rotates in accordance with three-phase (U, V and W) driving electric power is employed as the motor 12 in the present embodiment. The EPS actuator 10 reduces the speed of rotation of the motor 12 and transmits the rotation with the reduced speed to the column shaft 3a. In this way, the EPS actuator 10 applies the motor torque to the steeling system as assist force.

A torque sensor 14 and a vehicle speed sensor 15 are connected to the ECU 11. A target value of assist force (target assist force) that is applied to the steering system is determined on the basis of a steering torque τ detected by the torque sensor 14 and a vehicle speed V detected by the vehicle speed sensor 15.

The motor 12 in the present embodiment is provided with a motor rotation angle sensor 16 that may function as a displacement detection device for detecting a rotation angle (electric angle) θ of the motor 12. Specifically, a disc-shaped permanent magnet (not shown) is coaxially fixed to the distal end of the rotary shaft of the motor 12 that is a detection target. The permanent magnet has, for example, ten poles that are arranged at equal angular intervals (36 degrees), and has "5(=10/2)" pole pairs.

Figure 2:
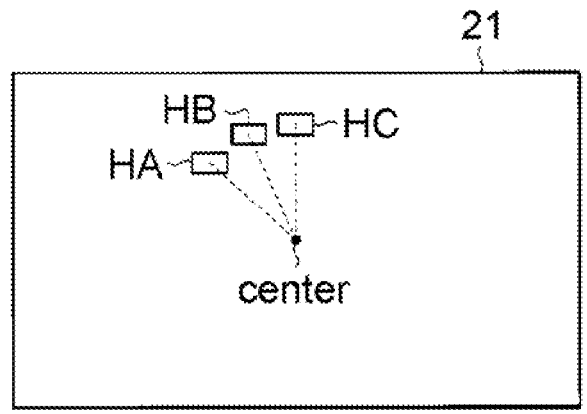
FIG. 2 is a schematic configuration view of a motor rotation angle sensor.

As shown in FIG. 2, a plurality of (three) Hall elements HA, HB, HC are arranged on a substrate 21 at equal angular intervals (24 degrees) in a circumferential direction about the rotary shaft of the motor 12 (the center of the permanent magnet). The substrate 21 is arranged near the permanent magnet so as to be opposed to the permanent magnet The Hall elements HA, HB, HC may function as displacement detection sensors and magnetic sensors. Each of the Hall elements HA to HC generates and outputs a voltage (Hall voltage VhA, VhB or VhC) based on the density of magnetic flux applied in a direction perpendicular to a current (control current) flowing therethrough.

Figure 3:
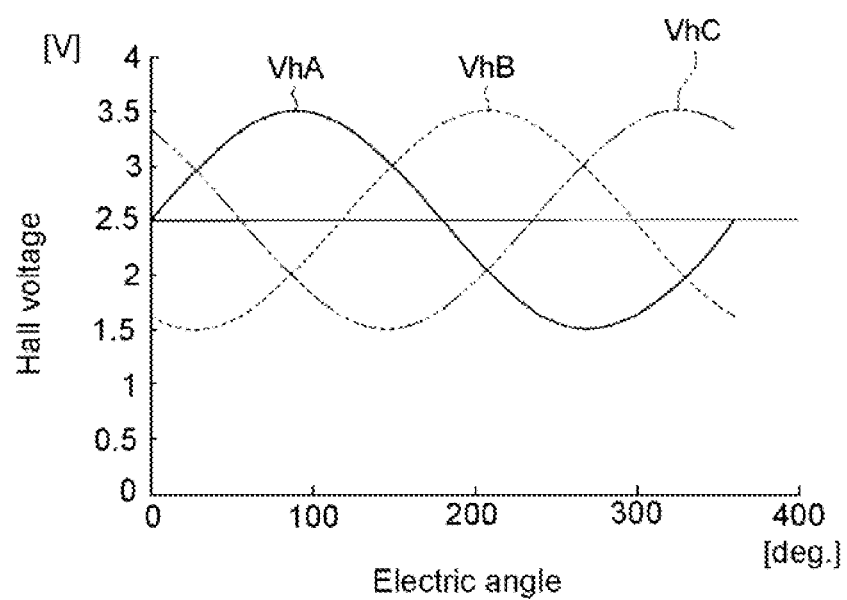
FIG. 3 is a graph that illustrates the correlation between an electric angle (rotation angle) and a Hall voltage.

Because the permanent magnet has "5" pole pairs that are arranged in the circumferential direction of the motor 12, the following, correlation is established.
Electric Angle 360 degrees Mechanical Angle 72 degrees
Therefore, Electric Angle 120 degrees=Mechanical Angle 24 degrees
That is, the Hall elements HA to HC are arranged at intervals of 120 degrees in electric angle. As shown in FIG. 3, the phases of amplitude changes of the Hall voltages VhA to VhC: of the Hall elements HA to HC with respect to the rotation of the motor 12 differ from each other by 120 degrees in electric angle. Because each of the Hall voltages VhA to VhC is expressed by "SIN θ", if the offset and phase of the center of oscillation are ignored, the ECU 11 is able to detect the rotation angle θ with the use of only one of the Hall voltages VhA to VhC according to the following mathematical expression.

$$\theta = ARCSIN(SIN\ \theta)$$

However, the ECU 11 is not able to acquire the rotation direction of the motor 12 with the use of only one of the Hall voltages VhA to VhC. Thus, the ECU 11 acquires the rotation direction of the motor 12 with the use of two of the Hall voltages VhA to VhC.

That is, the ECU 11 computes rotation angles θ on the basis of the Hall voltages VhA to VhC of all the Hall elements HA to HC, respectively, and detects the rotation angle θ and the rotation direction with the use of two of the Hall voltages VhA to VhC (the Hall voltages VhA, VhB in the present embodiment). Note that the remaining one of the Hall voltages VhA to VhC (the Hall voltage VhC in the present embodiment) is used for backup.

The ECU 11 supplies three-phase driving electric power to the motor 12 through current control that is executed using, for example, the rotation angle θ. That is, the ECU 11 according to the present embodiment controls the operation of the motor 12, that is, the operation of the EPS actuator 10, through supply of the driving electric power. By controlling motor currents such that motor torque corresponding to the above-described target assist force is generated, it is possible to apply optimal assist force to the steering system (power assist control).

Figure 4:
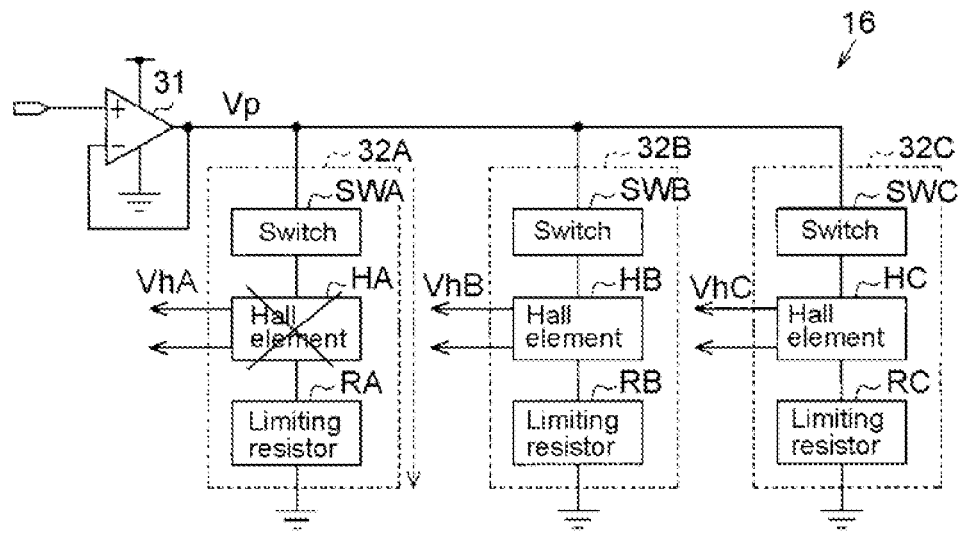
FIG. 4 is a circuit diagram that schematically shows the electrical configuration of the motor rotation angle sensor according to an embodiment of the invention.
Figure 5:
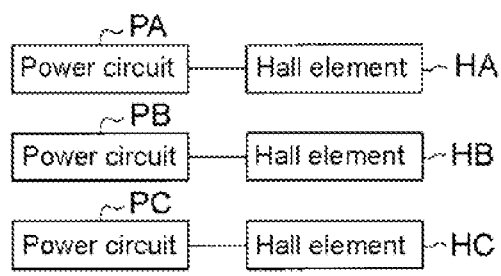
FIG. 5 is a block diagram that schematically shows the electrical configuration of a conventional displacement detection device.
Figure 6:
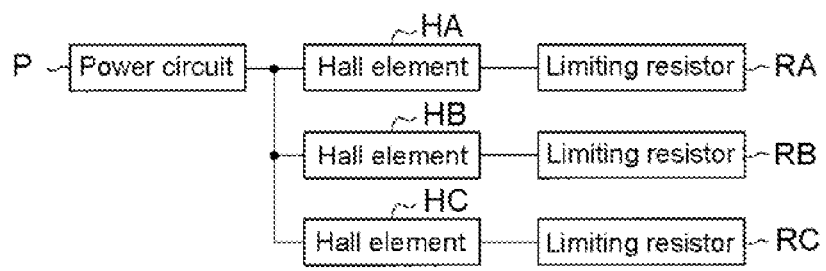
FIG. 6 is a block diagram that schematically shows the electrical configuration of another conventional displacement detection device.

Next, the electrical configuration of the motor rotation angle sensor 16 in the present embodiment will be described. As shown in FIG. 4, a plurality of (three in the present embodiment) parallel-connected rotation angle detecting circuits 32A, 32B, 32C are connected to the output terminal of an operational amplifier 31. The non-inverting input terminal (+) of the operational amplifier 31 is electrically connected to the D/A output terminal (not shown) of the ECU 11. That is, the rotation angle detecting circuits 32A, 3213, 32C are formed by connecting switches SWA, SWB, SWC, the Hall elements HA, HB, HC and the limiting resistors RA, RB, RC in series with one another, respectively The switches SWA, SWB, SWC each may function as interrupting means formed of for example, a transistor (FET, bipolar transistor). The rotation angle detecting circuits 32A to 32C are electrically connected at the switches SWA to SWC to the output terminal of the operational amplifier 31, and are grounded at the limiting resistors RA to RC, respectively. The output terminal of the operational amplifier 31 is also electrically connected to the inverting input terminal (−) of the operational amplifier 31. A fixed voltage Vp is supplied as electric power from the ECU 11 to each of the rotation angle detecting circuits 32A to 32C via the operational amplifier 31. The operational amplifier 31 constitutes a power circuit (constant-voltage circuit) shared by all the rotation angle detecting circuits 32A to 32C.

The switches SWA to SWC are electrically connected to the ECU 11 at their control terminals (for example, the gates of FETs), and their on/off states are controlled on the basis of control signals from the ECU 11. The switches SWA to SWC are normally kept on. For example, when a short-circuit fault has occurred in one of the Hall elements HA to HC, a corresponding one of the switches SWA to SWC, which is connected to the short-circuited one of the Hall elements HA to HC, is turned off. This is because a corresponding one of the rotation angle detecting circuits 32A to 32C, which has the short-circuited one of the Hall elements HA to HC, is disconnected from the operational amplifier 31 (system).

The Hall elements HA to HC each are supplied with the fixed voltage Vp from the operational amplifier 31 when a corresponding one of the switches SWA to SWC is on. Thus, a current (control current) based on its resistance value and the resistance value of a corresponding one of the limiting resistors RA to RC flows through each of the Hall elements HA to HC. As described above, each of the Hall elements HA to HC generates the Hall voltage (VhA to VhC) based on the density of magnetic flux applied in a direction perpendicular to the current flowing, therethrough. The Hall elements HA to HC output the Hall voltages VhA to VhC to the A/D input terminal (not shown) of the ECU 11. The ECU 11 detects, fix example, the rotation angle θ of the motor 12, in the above-described manner, on the basis of these Hall voltages VhA to VhC.

When a short-circuit fault has occurred in one of the Hall elements HA to HC, a corresponding one of the Hall voltages VhA to VhC of the short-circuited one of the Hall elements HA to HC drops to a low level. The ECU 11 determines whether any one of the Hall voltages VhA to VhC drops to a low level, for example, by comparing the Hall voltages VhA to VhC with a threshold. In this way, the ECU 11 detects the short-circuited one of the Hall elements HA to HC, which outputs the low-level one of the Hall voltages VhA to VhC.

The limiting resistors RA to RC have resistance value substantially equal to each other. Each of the limiting resistors RA to RC decreases a voltage on the basis of its resistance value when current flows therethrough. For example, when a short-circuit fault has occurred in one of the Hall elements HA to HC, a corresponding one of the limiting resistors RA to RC suppresses a value of current flowing through a corresponding one of the switches SWA to SWC, which is connected to the short-circuited one of the Hall elements HA to HC. Specifically, for example, if a short-circuit fault has occurred in the Hall element HA and the resistance value of the limiting resistor RA is ra, a value la of current flowing through the switch SWA (rotation angle detecting circuit 32A) is "Vp/ra" at a maximum. Thus, by setting the resistance value ra of the limiting resistor RA such that the current value ia is lower than the maximum rating of the switch SWA, a current that exceeds the maximum rating is prevented from flowing through the switch SWA. As a result, the durability of the switch SWA is improved. This also applies to the case where a short-circuit fault has occurred in one of the other Hall elements HB, HC.

As described above, in the present embodiment, it is possible to detect, for example, the rotation angle θ of the motor 12, with the use of two of the Hall elements HA to HC. Therefore, even if one of the Flail elements HA to HC (rotation angle detecting circuits 32A to 32C) is disconnected from the system, detection of the rotation angle θ of the motor 12 is not immediately affected.

Next, the operation according to the present embodiment will be described. When all the Hall elements HA to HC operate properly and all the switches SWA to SWC are kept on, if control currents flow through all the respective Hall elements HA to HC, the Hall elements HA to HC generate Hall voltages VhA to VhC based on the above-described magnetic flux densities, respectively. The ECU 11 detects, for example, the rotation angle θ of the motor 12, with the use of two of the Hall voltages VhA to VhC (in the present embodiment, the Hall voltages VhA and VhB).

If a short-circuit fault occurs in one of the Hall elements HA to HC (for example, the Hall element HA), an overcurrent flows through the rotation angle detecting circuit 32A that includes the short-circuited Hall element HA as indicated by the dashed arrow in FIG. 4. At the same time, the Hall voltage VhA of the Hall element HA drops to a low level. The ECU 11 determines that the Hall voltage VhA drops to a low level, thereby detecting a short-circuit fault of the Hall element HA that outputs the Hall voltage VhA, and turning off the switch SWA to disconnect the rotation angle detecting circuit 32A having the Hall element HA from the system. In this way, an overcurrent that is supposed to flow through the rotation angle detecting circuit 32A is interrupted, and the power supply operation of the operational amplifier 31 is stabilized. Thus, the influence on voltage supplied to the other rotation angle detecting circuits 32B, 32C (the Hall elements HB, HC) is eliminated. At the same time, the ECU 11 switches the mode so as to detect, for example, the rotation angle θ of the motor 12 with the use of the normal two Hall voltages VhB, VhC. In this way, it is possible to continue detection of, for example, the rotation angle θ with the use of the Hall elements HB, HC. Therefore, the ECU 11 is able to continue detection of, for example, the rotation angle θ of the motor 12 on the basis of the Hall voltages VhB, VhC of the remaining properly-operating Hall elements HB, HC without being affected by the short-circuited Hall element HA (backup operation).

As described above, even if a short-circuit fault has occurred in the Hall element HA, the value ia of current flowing through the switch SWA is suppressed by the limiting resistor RA to "Vp/ra" at, a maximum. Thus, a current that exceeds the maximum rating is prevented from flowing through the switch SWA.

As described in detail above, according to the present embodiment, the following advantageous effects are obtained.

In the present embodiment, if a short-circuit fault has occurred in one of the Hall elements HA to HC, power supply to the one of the Hall elements HA to HC is interrupted by a corresponding one of the switches SWA to SWC, which is connected to the short-circuited one of the Hall elements HA to HC. Thus, it is possible to prevent an overcurrent from flowing through the short-circuited one of the Hall elements HA to HC.

Thus, even if a short-circuit fault has occurred in one of the Hall elements HA to HC, the influence on supply of power to the remaining normally-operating two of the Hall elements HA to HC is eliminated. Therefore, it is possible to continue detection of, for example, the rotation angle θ with the use of the properly-operating two of the Hall elements HA to HC. That is, the operational amplifier 31 is required to have a normal-level power supplying capability that is high enough to allow all the Hall elements HA to HC to be operable. Thus, it is possible to reduce the circuit size for the operational amplifier 31 used to supply electric power, and, consequently, it is possible to reduce the circuit size as a whole device. In addition, when supply of power to all the Hall elements HA to HC is performed by the operational amplifier 31, a difference in supplied electric power among the Hall elements HA to HC is less likely to be caused than when the supply of power is performed by individual power circuits. That is, variations in detection accuracy among the Hall elements HA to HC are less likely to occur. Thus, it is possible to improve detection accuracy at the time of detecting the rotation angle θ and rotation direction of the motor 12 by detecting two of the Hall voltages VhA to VhC of the Hall elements HA to HC (usually, the Hall voltages VhA, VhB).

In the present embodiment, with the use of the Hall elements HA to HC that may function as magnetic sensors, it is possible to detect the rotation angle θ of the motor 12 without contacting the rotary shaft (permanent magnet) of the motor 12.

in the present embodiment, with the use of the compact Hall elements HA to HC having high reliability, it is possible to detect the rotation angle θ of the motor 12.

In the present embodiment, when a short-circuit fault has occurred in one of the Hall elements HA to HC, an overcurrent flows through the one of the Hall elements HA to HC and a corresponding one of the switches SWA to SWC, which is connected to the short-circuited one of the Hall elements HA to HC. However, current flowing through the corresponding one of the switches SWA to SWC is reduced by an amount corresponding to a voltage drop in a corresponding one of the limiting resistors RA to RC. Thus, it is possible to improve the durability of the switches SWA to SWC.

According, to the present embodiment, it is possible to provide the EPS 1 that includes the motor rotation angle sensor 16 with which the circuit size is reduced as a whole device without reduction in detection accuracy.

In the present embodiment, even if a short-circuit fault has occurred in one of the Hall elements HA to HC, it is possible to continue detection of the rotation angle θ of the motor 12 with the use of the remaining two of the Hall elements HA to HC. Therefore, it is possible to temporarily maintain the reliability of the motor 12.

In the present embodiment, the resistance values of the limiting resistors RA to RC may be any values as long as the voltage is decreased such that, when a short-circuit fault has occurred in one of the Hall elements HA to HC, an overcurrent flowing through a corresponding one of the switches SWA to SWC does not exceed the maximum rating. Therefore, it is possible to set the resistance values of the limiting resistors RA to RC to relatively small values Thus, when the Hall elements HA to HC are properly operating, the voltages applied to the Hall elements HA to HC increase by an amount corresponding to a decrease in voltage drop in the limiting resistors RA to RC. Therefore, it is possible to increase the dynamic range of detecting the rotation angle θ.

In the present embodiment, if a short-circuit fault has occurred in one of the Hall elements HA to HC, it is possible to disconnect a corresponding one of the rotation angle detecting circuits 32A to 32C, which has the short-circuited one of the Hall elements HA to HC, from the system. Therefore, it is possible to perform backup operation with the use of the remaining properly-operating two of the Hall elements HA to HC in a further stable state.

Note that the above-described embodiment may be modified into the following alternative embodiments.

In the above-described embodiment, the parallel-connected rotation angle detecting circuits 32A to 32C (series circuits formed of the switches SWA to SWC, the Hall elements HA to HC and the limiting resistors RA to RC, respectively) are connected to the operational amplifier 31. Alternatively, for example, parallel-connected series circuits formed of the switches SWA to SWC and the Hall elements HA to HC, respectively, may be connected to the operational amplifier 31 and a common limiting resistor may be connected in series with the parallel circuits. Through such a modification, the circuit configuration is further simplified.

In the above-described embodiment, the fixed voltage Vp is supplied from the ECU 11 to the Hall elements HA to HC (rotation angle detecting circuits 32A to 32C) via the operational amplifier 31. Alternatively, for example, a fixed voltage (Vp) may be supplied from a constant-voltage circuit, which is independent of the ECU 11, to the Hall elements HA to HC. Further alternatively, a fixed voltage (Vp) may be directly supplied from a battery, which serves as a power circuit, to the Hall elements HA to HC.

In the above-described embodiment, the motor rotation angle sensor 16 includes the three Hall elements HA to HC including one Hall element for backup. Alternatively, for example, when only the rotation angle θ of the motor 12 is detected, a motor rotation angle sensor may include two Hall elements including one Hall element for backup. Further alternatively, a motor rotation angle sensor may include four or more Hall elements including more than one backup Hall elements.

In the above-described embodiment, the three Hall elements HA to HC are arranged at intervals of 120 degrees in electric angle (24 degrees in mechanical angle). Alternatively, the three Hall elements HA to HC may be arranged at intervals of appropriate electric angle or mechanical angle on the basis of a detection target. In addition, when the motor rotation angle sensor includes two Hall elements or four or more Hall elements, the Hall elements may be arranged at intervals of appropriate electric angle or mechanical angle on the basis of a detection target.

In the above-described embodiment, the Hall elements (HA to HC) are employed as the magnetic sensors. Alternatively, other magnetic sensors, such as magnetoresistance elements (MR) and magnetic impedance elements (MI), may be used.

In the above-described embodiment, the Hall elements (HA to HC) are employed as the displacement detection sensors. Alternatively, other displacement detection sensors, such as photo-interrupters, may be used Any displacement detection sensors may be used as long as the displacement detection sensor requires electric power for its operation, In the above-described embodiment, the switches (SWA to SWC) formed of a transistor are employed as the interrupting means. Alternatively, for example, relay switches may be used.

In the above-described embodiment, the invention is applied to the motor rotation angle sensor 16 that detects the rotation angle θ of the motor 12. Alternatively, for example, the invention may be applied to a torque sensor that detects torsion of the rotary shaft of the motor 12. Further alternatively, the invention may be applied to a torque sensor that detects a steering torque (torsion of the steering shaft 3). The invention may be applied to any displacement detection devices that include a plurality of displacement detection sensors in order to improve redundancy.

In the above-described embodiment, the invention is applied to the so-called, column type EPS 1. Alternatively, the invention may be applied to a so-called pinion-type or rack-assist-type EPS a vehicle steering system that has no power assist function, or other appropriate systems.

What is claimed is:

1. A displacement detection device, comprising:
a plurality of displacement detection sensors, wherein a subset of displacement detection sensors of the plurality of displacement sensors are operable at a same time, the subset being sensors that are operating at a voltage above a defined short-circuit fault condition; and
a plurality of interrupting elements, each interrupting element configured to interrupt supply of power for operating a corresponding one of the displacement detection sensors.

2. The displacement detection device according to claim 1, wherein the displacement detection sensors are magnetic sensors.

3. The displacement detection device according to claim 2, wherein the displacement detection sensors are Hall elements.

4. The displacement detection device according to claim 1, wherein a limiting resistor is connected in series with each of the displacement detection sensors.

5. A vehicle steering system, comprising the displacement detection device according to claim 1.

6. A motor that is provided with the displacement detection device according to claim 1 as a motor rotation angle sensor that detects a rotation angle of the motor or a torque sensor that detects torsion of the rotary shaft of the motor.

7. The displacement detection device according to claim 1, further comprising a substrate, wherein the plurality of displacement detection sensors are arranged on the substrate at equal angular intervals in a circumferential direction.

8. The displacement detection device according to claim 1, further comprising an operational amplifier, wherein the plurality of displacement detection sensors is connected at the plurality of switches to an output terminal of the operational amplifier, the output terminal of the operational amplifier further connected to an inventing input terminal of the operational amplifier, and a fixed voltage supplied to each of the plurality of displacement detection sensors.

9. The displacement detection device according to claim 4, wherein a resistance value of each of the limiting resistors limits an electrical current to a maximum value that is lower than a maximum rating of a corresponding interrupting element of the plurality of interrupting elements.

10. The displacement detection device according to claim 1, further comprising an electronic control unit (ECU) configured to determine when a voltage of any sensor of the subset of displacement detection sensors is below a predetermined value, the predetermined value indicating an overcurrent flow and the short-circuit fault condition, the ECU further configured to disconnect the displacement detection sensor with the overcurrent flow by turning off a corresponding element of the plurality of interruption elements, the ECU additionally configured, when detecting the overcurrent flow, to turn on a corresponding element of the plurality of interruption elements that is not within the subset of displacement detection sensors and not operating prior to turning off the element of the plurality of elements.

11. The displacement detection device according to claim 1, wherein each of the displacement detection sensors of the plurality of displacement detection sensors is connected in series with a corresponding interrupting element of the plurality of interrupting elements.

* * * * *